(12) United States Patent
Reiling

(10) Patent No.: US 7,241,380 B2
(45) Date of Patent: Jul. 10, 2007

(54) ULTRAVIOLET TREATMENT UNIT AND SEPTIC TANK SYSTEM

(76) Inventor: Dennis R. Reiling, 319 N. Main St., Churubusco, IN (US) 46723

( * ) Notice: Subject to any disclaimer, the term of this patent is extended or adjusted under 35 U.S.C. 154(b) by 62 days.

(21) Appl. No.: 11/153,094

(22) Filed: Jun. 15, 2005

(65) Prior Publication Data

US 2006/0283793 A1     Dec. 21, 2006

(51) Int. Cl.
*C02F 1/32* (2006.01)
(52) U.S. Cl. ............... 210/170.08; 210/532.2; 210/748; 250/436
(58) Field of Classification Search .......... 210/170, 210/259, 532.2, 748; 250/432 R, 434, 435, 250/436; 422/24
See application file for complete search history.

(56) References Cited

U.S. PATENT DOCUMENTS

| | | | |
|---|---|---|---|
| 3,672,823 A | 6/1972 | Boucher | |
| 3,825,494 A | 7/1974 | Call et al. | |
| 3,837,800 A | 9/1974 | Wood | |
| 3,948,772 A | 4/1976 | Ellner | |
| 4,103,167 A | 7/1978 | Ellner | |
| 4,204,956 A | 5/1980 | Flatow | |
| 4,229,202 A * | 10/1980 | Mullerheim et al. | 210/170 |
| 4,276,256 A * | 6/1981 | Karamian | 422/24 |
| 4,400,270 A | 8/1983 | Hillman | |
| 4,482,809 A | 11/1984 | Maarschalkerweerd | |
| 4,872,980 A | 10/1989 | Maarschalkerweerd | |
| 4,895,645 A * | 1/1990 | Zorich, Jr. | 210/170 |
| 5,006,244 A | 4/1991 | Maarschalkerweerd | |
| 5,208,461 A * | 5/1993 | Tipton | 250/436 |
| 5,288,412 A * | 2/1994 | Voorhees et al. | 250/436 |
| 5,352,357 A | 10/1994 | Perry | |
| 5,366,705 A | 11/1994 | Reidy | |
| 5,418,370 A | 5/1995 | Maarschalkerweerd | |
| 5,590,390 A | 12/1996 | Maarschalkerweerd | |
| 5,635,133 A | 6/1997 | Glazman | |
| 5,685,994 A | 11/1997 | Johnson | |
| 5,840,196 A * | 11/1998 | Laurent | 210/532.2 |
| 6,187,183 B1 | 2/2001 | Weaver et al. | |
| 6,193,894 B1 * | 2/2001 | Hollander | 210/748 |
| 6,296,775 B1 | 10/2001 | Moody et al. | |
| 6,583,422 B2 | 6/2003 | Boehme | |
| 6,659,431 B1 | 12/2003 | Fang et al. | |
| 6,713,771 B2 | 3/2004 | Nakagawa et al. | |

OTHER PUBLICATIONS

Severn Trent Services, Ultraviolet Products, (2002), (4 pages), Colmar, PA.
Severn Trent Services, Residential Wall Mounted Series 8102-JD, (2003), (2 pages), Colmar, PA.
Norweco, Inc., Singulair Bio-Kinetic Model 960 Wastewater Treatment System Owner's Manual, (2004), (6 pages), Norwalk, OH.

(Continued)

*Primary Examiner*—Christopher Upton
(74) *Attorney, Agent, or Firm*—Law Offices of Brian C. Pauls

(57) ABSTRACT

A septic tank system including a tank and a downstream fluid system. The tank is adapted to receive sewerage and discharge liquid effluent into the downstream fluid system. A treatment chamber is located in the downstream fluid system and receives an ultraviolet light transmitting device which is removably insertable into the treatment chamber. A photo-electric device can be positioned in the downstream fluid system proximate the ultraviolet light transmitting device to monitor the operation of the device.

16 Claims, 2 Drawing Sheets

OTHER PUBLICATIONS

Norweco, Inc., Singular Bio-Kinetic Wastewater Treatment System Model 960, (2004), (6 pages), Norwalk, OH.

Norweco, Inc., Singular Bio-Kinetic Wastewater Treatment System, (2004), (6 pages), Norwalk, OH.

Consolidated Treatment Systems, Inc., Ultraviolet Disinfection Unit, (unknown date), (3 pages), Franklin, OH.

International Water-Guard Industries Inc., IWG-I-LV-WW-2 Wastewater Disinfection Unit, (unknown date), (2 pages), Burnaby, BC Canada.

Salcor Inc., Salcor 3G Waste Water Ultraviolet Disinfection Unit, (unknown date), (6 pages), Fallbrook, CA.

* cited by examiner

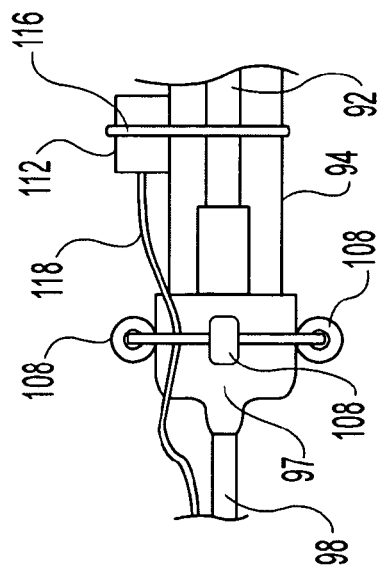
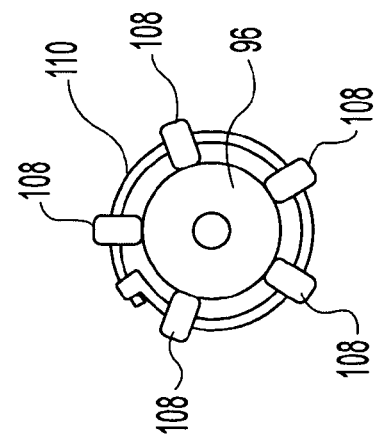
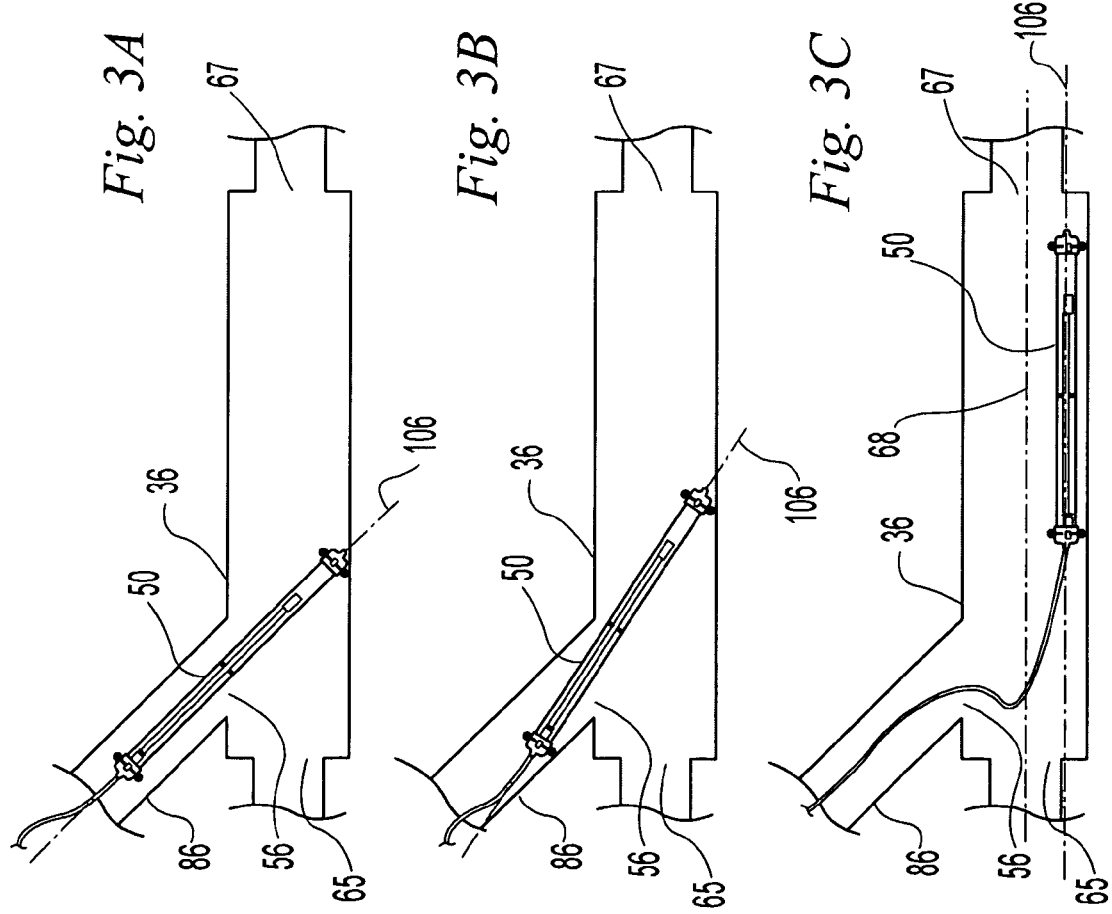

ULTRAVIOLET TREATMENT UNIT AND SEPTIC TANK SYSTEM

BACKGROUND OF THE INVENTION

1. Field of the Invention

The present invention relates to septic tank systems and, more particularly, to ultraviolet light disinfection units for septic tank systems.

2. Description of the Related Art

Many people living in rural areas are not served by municipal sewage systems and must utilize a septic tank system or other method to treat their domestic wastewater. A conventional septic tank system includes two primary components, a septic tank and a drainfield. The septic tank receives the raw sewage. In the septic tank, the heavy solids settle to the bottom of the tank where the organic solids are decomposed by anaerobic digestion. Lighter solids float to the top of the liquid layer in the septic tank and form a layer of scum. The liquid effluent, with the solids removed therefrom, is then discharged from the septic tank. Septic tanks can have a simple single compartment design or may include multiple compartments, baffles and other structures designed to remove a larger percentage of the solids from the wastewater before the liquid effluent is discharged from the septic tank. A pump may be utilized to discharge the liquid effluent from the septic tank, or, in a gravity flow system, liquid effluent is discharged from the tank as additional sewage enters the tank.

After the liquid effluent is discharged from the septic tank, a downstream fluid system conveys the effluent to a location where it is discharged into the environment. Typically, the effluent is discharged into a drainfield or from a surface discharge pipe. The use of a drainfield is more common and a typical drainfield includes a distribution box that receives the effluent and then distributes it to several perforated pipes. The perforated pipes are located below grade in a gravel-filled trench. The effluent is discharged from the perforated pipes into the gravel-filled trench where it percolates into the surrounding soil. As the effluent percolates through the surrounding soil the effluent is filtered by the soil and undergoes treatment by chemical and biological processes that occur within the soil layer before the effluent reaches an underlying water table or a body of surface water.

Recently, it has become more common to treat the effluent within the septic tank system with ultraviolet light before it is discharged into the surrounding environment either through a drainfield or surface discharge pipe. Exposure to ultraviolet light kills many of the microorganisms present in the liquid effluent discharged from the septic tank system and many of the governmental bodies responsible for regulating the installation and operation of septic tanks are mandating performance levels that require a secondary treatment, e.g., exposure to ultraviolet light, of the liquid effluent before it is released to the environment.

Although septic tank systems which utilize ultraviolet light treatment of the liquid effluent discharged from the septic tank are known, the improvement of such systems is desirable.

SUMMARY OF THE INVENTION

The present invention provides an improved septic tank system that utilizes ultraviolet light treatment of the liquid effluent. The disclosed ultraviolet light unit is relatively inexpensive to install, effective and is easily serviced.

The invention comprises, in one form thereof, a septic tank system that includes a tank and a downstream fluid system. The tank is adapted to receive sewerage and has a tank outlet positioned to discharge liquid effluent from the tank. The downstream fluid system is in fluid communication with the tank outlet and conveys the effluent discharged from the tank to at least one discharge location where the effluent is discharged from the septic tank system. A treatment chamber is operably disposed in the downstream fluid system between the tank outlet and the at least one discharge location. The treatment chamber has an interior surface defining a chamber volume wherein effluent discharged from the tank into the downstream fluid system flows through the chamber volume. An ultraviolet light emitting device is removably insertable into the chamber volume and is non-sealingly engageable with the interior surface.

The invention comprises, in another form thereof, a septic tank system that includes a tank and a downstream fluid system. The tank is adapted to receive sewerage and has a tank outlet positioned to discharge liquid effluent from the tank. The downstream fluid system is in fluid communication with the tank outlet and conveys effluent discharged from the tank to at least one discharge location where the effluent is discharged from the septic tank system. The downstream fluid system includes a first fluid conduit and a second fluid conduit. A treatment chamber is also operably disposed in the downstream fluid system between the tank outlet and the at least one discharge location. The treatment chamber has an interior surface defining a chamber volume and defines an inlet and an outlet in fluid communication with the chamber volume. The first fluid conduit is in direct fluid communication with the inlet and the second fluid conduit is in direct fluid communication with the outlet. Effluent discharged from the tank into the downstream fluid system enters the chamber volume through the inlet and is discharged from the chamber volume through the outlet. The first fluid conduit defines a first cross sectional flow area, the second fluid conduit defines a second cross sectional flow area, and the chamber volume defines a third cross sectional flow area. Each of the first and second cross sectional flow areas are less than the third cross sectional flow area. An ultraviolet light emitting device is removably insertable into the chamber volume.

The invention comprises, in still another form thereof, a septic tank system that includes a tank and a downstream fluid system. The tank is adapted to receive sewerage and has a tank outlet positioned to discharge liquid effluent from the tank. The downstream fluid system is in fluid communication with the tank outlet and conveys effluent discharged from the tank to at least one discharge location where the effluent is discharged from the septic tank system. A treatment chamber is operably disposed in the downstream fluid system between the tank outlet and the at least one discharge location. The treatment chamber has an interior surface defining an elongate chamber volume and a chamber axis. Effluent discharged from the tank into the downstream fluid system flows through the chamber volume. The treatment chamber is positioned below a ground surface and the chamber axis defines an angle with a horizontal plane of less than approximately 5 degrees. An access port is defined by the treatment chamber and is in communication with the elongate chamber volume. An elongate ultraviolet light emitting device defining a second axis is also provided. The ultraviolet light emitting deivce is removably insertable into the chamber volume through the access port from a position above the ground surface. When the device is disposed within the chamber volume, the second axis defined by the device is positioned substantially parallel with the chamber axis.

The invention comprises, in yet another form thereof, a septic tank system that includes a tank and a downstream fluid system. The tank is adapted to receive sewerage and has a tank outlet positioned to discharge liquid effluent from the tank. The downstream fluid system is in fluid communication with the tank outlet and conveys effluent discharged from the tank to at least one discharge location where the effluent is discharged from the septic tank system. An ultraviolet light emitting device is disposed in the downstream fluid system. A photoelectric device is also disposed in the downstream fluid system proximate the ultraviolet light emitting device. An alarm device is operably coupled to the photoelectric device wherein the alarm device is activated when the photoelectric device fails to sense a predetermined level of light.

The invention comprises, in still another form thereof, a method of monitoring the operation of a septic tank system. The method includes providing a septic tank system having a tank and a downstream fluid system and positioning an ultraviolet light emitting device in the downstream fluid system. The method further includes positioning a photoelectric device in the downstream fluid system proximate the ultraviolet light emitting device and activating an alarm device when the photoelectric device fails to detect a predetermined level of light.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIGS. 3A, 3B and 3C are schematic cross sectional views of a treatment chamber showing the progressive insertion of an ultraviolet light emitting device into the chamber.

FIG. 4 is an end view of the ultraviolet light emitting device.

FIG. 5 is a partial side view of the ultraviolet light emitting device.

Figure 1:
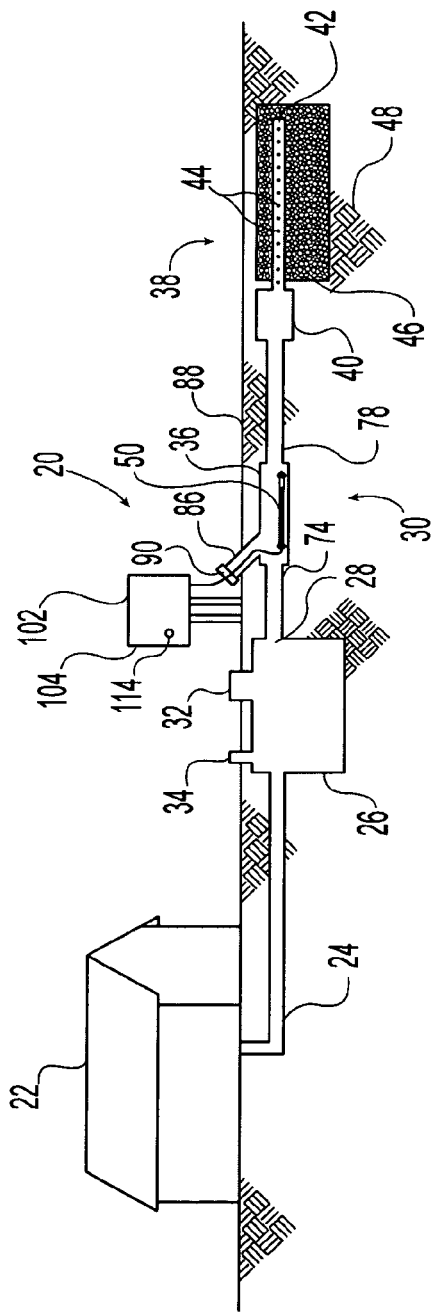
FIG. 1 is a schematic view of a septic tank system in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

A septic tank system 20 in accordance with the present invention is shown in FIG. 1. In the illustrated example, system 20 receives sewerage generated from a single family dwelling 22 through sewer line 24. Sewer line 24 conveys the sewerage to septic tank 26. Septic tank 22 is a conventional septic tank wherein solids are settled to the bottom of the tank. Lighter solids form a layer at the top of the tank and the remaining liquid effluent is discharged through tank outlet 28 into the downstream fluid system 30. Although not shown, septic tank 22 may include baffles and/or be a multicompartment tank to facilitate the separation and treatment of the incoming sewerage. The use of such baffles and multiple compartments is well-known to those having ordinary skill in the art.

For example, a multi-compartment tank from a Singular® Bio-Kinetic® Model 960 Wastewater Treatment System can be employed with the present invention. Such a tank is commercially available from licensed distributors of Norweco, Inc. having a place of business in Norwalk, Ohio and includes three compartments. The first compartment is used to separate solids from the wastewater and provide anaerobic treatment of the waste contained within the first chamber. The second chamber includes a mechanical aerator and provides for the aerobic treatment of the wastewater. The third chamber is a clarifying chamber which filters the wastewater before it is discharged through the tank outlet. As mentioned above, the use of such multicompartment tanks is well-known to those having ordinary skill in the art. Although multicompartment tanks having mechanical aerators to provide an aerobic treatment chamber are sometimes referred to as biological treatment devices to distinguish them from septic tanks without such aerobic treatment chambers, the term septic tank system and words of similar import are used herein to include such multicompartment tanks having an aeration compartment which are suitable for treating domestic wastewater from individual homes, clusters of homes, commercial properties or small clusters of commercial properties.

The illustrated septic tank 22 includes a service opening 32, e.g., a manhole with cover, through which the solids located in the tank are periodically removed and for providing access to septic tank for repair and maintenance purposes. Septic tank 22 also includes one or more inspection ports 34 through which the interior of tank 22 can be viewed.

The downstream fluid system 30 which receives the liquid effluent discharged from tank 22 includes a treatment chamber 36 and a conventional drainfield 38. Drainfield 38 includes a distribution box 40 which feeds liquid effluent into a plurality of perforated pipes 42 (only one is shown). Perforated pipes 42 each include a plurality of openings. Each of the openings in the perforated pipes 42 define a discharge location 44 through which the effluent flows into a gravel filled trench 46. After being discharged from the perforated pipes 42 into the gravel filled trench 46, the liquid effluent enters the surrounding soil 48. As the effluent flows through the gravel bed and soil, it is filtered by the soil and the organic material in the effluent is aerobically digested by bacteria living in the soil. This method of releasing and treating the liquid effluent in a drainfield is well known to those having ordinary skill in the art.

Various other methods of discharging the liquid effluent into the surrounding environment are also known to those having ordinary skill in the art and may be employed with the present invention in alternative embodiments of septic system 20. For example, it is also known to discharge the liquid effluent of a septic tank system into a seepage pit or dry well. Such dry wells may be formed by a precast tank having perforated sidewalls or a tank formed by open-jointed masonry or stone walls and which is surrounded by a gravel layer. In areas where the existing soil is not well adapted for receiving liquid discharges, e.g., where the soil is primarily clay or where the groundwater table is near the surface, a sand mound may be placed above the original ground level and perforated pipes located within the sand mound can be used to discharge the liquid effluent.

Figure 1A:
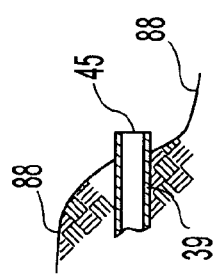
FIG. 1A is a view of an alternative discharge line for the septic tank system.

Furthermore, if the septic tank system provides a sufficient level of treatment, the liquid discharged from the system may be surface discharged, for example, into a ditch or stream as exemplified by discharge line 39 having a surface discharge location 45 (FIG. 1A) which could be used to replace the distribution box 40 and other downstream components of the drainfield 38.

Figure 2:
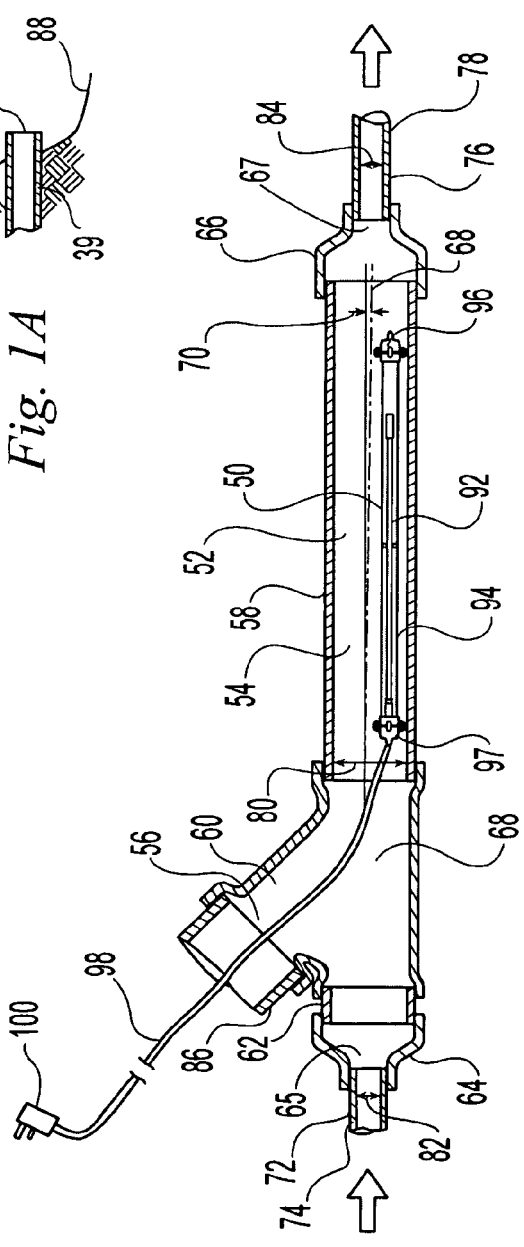
FIG. 2 is a cross sectional view of a treatment chamber.

Treatment chamber 36 is shown in greater detail in FIG. 2 and includes an ultraviolet light emitting device 50. As the liquid effluent flows through treatment chamber 36, the ultraviolet light emitted by device 50 sanitizes or kills many of the microorganisms present in the liquid effluent.

As best seen in FIG. 2, treatment chamber 36 has an interior surface 52 that defines an interior elongate chamber volume 54. Treatment chamber 36 includes an access port 56 in communication with chamber volume 54 through which device 50 is inserted and removed from chamber volume 54. In the illustrated embodiment, treatment chamber 36 is formed by joining a first length of cylindrical polyvinyl chloride (PVC) tubing 58 with a PVC Y-fitting 60, a second short length of PVC tubing 62 extends from the opposite end of Y-fitting 60 receive a reducer 64. Reducer 64 defines one end of treatment chamber 36 and a second reducer 66 located on the opposite end of tube 58 defines the other end of treatment chamber 36. Reducer 64 defines the inlet 65 through which effluent enters chamber volume 54 while reducer 66 defines the outlet 67 through which effluent is discharged from chamber volume 54.

As seen in FIG. 2, chamber volume 54 is an elongate volume that defines a central chamber axis 68. In the illustrated embodiment, system 20 is a gravity discharge system and effluent is discharged from tank 26 when incoming waste displaces liquid effluent through tank outlet 28. Downstream fluid system 30 is positioned at a slight angle to a horizontal plane so that effluent entering downstream fluid system 30 flows from tank outlet 28 to discharge locations 44 under the influence of gravity. In the illustrated embodiment, chamber axis 68 is substantially horizontal but is positioned on a slight incline, for example, angle 70 formed between axis 68 and a horizontal plane is less than about 5 degrees, so that liquid effluent is capable of flowing through chamber volume 54 solely under the influence of gravity.

It is also known to employ pumps to positively discharge liquid effluent from a septic tank and regulate the downstream flow of the effluent through the septic system. Alternative embodiments of the present invention could employ a pump to control and regulate the discharge and flow of liquid effluent from tank 22 and through downstream fluid system 30. For example, tank 26 could have a separate compartment in which the liquid effluent is collected before being discharged through tank outlet 28 by a pump, or, an entirely separate tank downstream of tank 26 could be provided for use as an effluent collection and pumping compartment.

Liquid effluent enters treatment chamber 36 from a first fluid conduit 72 is joined with reducer 64. Conduit 72 is located in the first portion 74 of the downstream fluid system 30 that immediately precedes treatment chamber 36 in the direction of fluid flow. In the illustrated embodiment, conduit 72 extends between tank outlet 28 and reducer 64. A second fluid conduit 76 is joined with reducer 66 and carries liquid effluent from treatment chamber 36 toward distribution box 40 in the second portion 78 of downstream fluid system 30 that immediately follows treatment chamber 36 in the direction of fluid flow.

As best seen in FIG. 2, chamber volume 54 has a diameter 80 that is larger than the diameter 82 of first conduit 72. Diameter 80 of chamber volume 54 is also larger than the diameter 84 of second conduit 76. In the illustrated embodiment, conduits 72, 76 and tubing 58, 62 are all cylindrical PVC tubing. Since tubing 58, 62 defining chamber volume 54 has a larger diameter 80 than the diameters 82, 84 of conduits 72, 76, chamber volume 54 defines a larger cross sectional flow area than conduits 72, 76. Due to this larger cross sectional flow area, the velocity of the liquid effluent flowing through treatment chamber 36 will be slower than the velocity of the effluent flowing through conduits 72, 76 under full flow conditions. In other words, under full flow conditions, the use of a relatively larger diameter treatment chamber 36 slows the velocity of the liquid effluent in treatment chamber 36 thereby increasing the dwell time of the liquid effluent in the treatment chamber where it is exposed to the ultraviolet light being emitted by device 50. In the illustrated embodiment, conduits 72, 76 are each PVC conduits having a nominal diameter of 4 inches (10.2 cm) while PVC tubing 58, 62 each have a nominal diameter of 6 inches (15.2 cm).

As also seen in FIG. 2, an inclined riser conduit 86 extends upwardly from Y-fitting 60. In the illustrated embodiment, Y-fitting 60 is a conventional PVC fitting and riser conduit 86 is a cylindrical PVC tube that extends at an angle of 30 degrees relative to chamber axis 68. Consequently, riser conduit 86 also forms an angle with a horizontal plane of approximately 30 degrees. More specifically, riser conduit 86 forms an angle of 30 degrees plus the magnitude of angle 70 with a horizontal plane. Riser conduit 86 extends from Y-fitting 60 to an elevation above ground surface 88 where it is easily accessible. A conventional cap fitting 90 can be located on the upper end of riser conduit 86 to inhibit the inflow of water through riser conduit 86. Cap fitting 90 includes a threaded, removable PVC cap that can be used close the upper end of riser conduit 86. A hole is drilled through the removable cap to allow for the passage of a power cord therethrough. It is also possible for the upper end of riser conduit 86 to be flush with the surrounding ground surface or be located in a sub-grade access box or similar structure.

In the illustrated embodiment, ultraviolet light emitting device 50 includes an ultraviolet light source that is an elongate ultraviolet light lamp 92. Lamp 92 is located in a water tight enclosure 94 that is substantially transparent to ultraviolet light. In the illustrated embodiment, enclosure 94 is a quartz tube having caps 96, 97 located at its opposite ends. It is also known, as exemplified by U.S. Pat. No. 6,296,775 B1, which is hereby incorporated herein by reference, to place an ultraviolet lamp in a resinous tube that is at least partially transparent to ultraviolet light, e.g., a Teflon® tube, to thereby provide a more rugged enclosure for the ultraviolet lamp.

An electrical power cord 98 is used to supply electrical power to lamp 92. The power cord is routed through riser conduit 86 and a plug 100 on the end of power cord 98 is connected with an electrical power supply 102, e.g., a conventional electrical outlet. In the illustrated embodiment, an electrical junction box 104 is installed above grade near the point at which riser 86 extends above the ground surface and power cord 98 is connected to a power supply 102 within box 104 as schematically depicted in FIG. 1. Depending upon the circumstances of each installation of a system 20, other configurations may be appropriate or desirable for connecting device 50 with a source of electrical power.

The opposite ends of quartz tube 94 are sealed with resilient caps 96, 97 to prevent the ingress of liquid into tube 94. Caps 96, 97 may be formed of rubber or other suitable material. A small hole is placed in cap 97 to allow electrical power cord 98 to extend therethrough. To ensure that resilient cap 97 engages power cord 98 in a water tight fashion, the hole through which power cord 98 passes is originally formed with a diameter less than the diameter of power cord 98 is formed in cap 97. For example, cap 97 can be pierced with a thin sharp member, e.g., a nail, without removing material from cap 97 to form the hole through which the power cord is passed. If necessary, a ballast for lamp 92 can be located either within tube 94 or proximate plug 100 at an elevation above the liquid effluent. Typically, when ballasts are provided remote from the lamp, there is a maximum distance, e.g., 18 feet (5.5 m) in the illustrated embodiment, of electrical power cord that may separate the lamp from the ballast. In the illustrated embodiment, plug 100 is formed integrally with the ballast.

As best understood with reference to FIGS. 3A-3C, device 50 is inserted and removed from chamber volume 54 through riser conduit 86. Initially, device 50 is inserted through the upper end of riser conduit 86 and lowered through conduit 86 with the axis 106 of device 50 being positioned substantially parallel with conduit 86. FIG. 3A illustrates the point at which axis 106 of device 50 is still substantially parallel with conduit 86 and device 50 has first engaged interior surface 52 of treatment chamber 36. Device 50 then tilts as it enters chamber volume 54 as depicted in FIG. 3B. FIG. 3C illustrates the point at which both ends of device 50 have entered chamber volume 54. In the illustrated embodiment, the PVC tubes used to form riser conduit 86 and treatment chamber tubes 58, 62 all have a nominal diameter of 6 inches (15.2 cm). Similarly, Y-fitting 60 has a nominal diameter of 6 inches (15.2 cm) for each of its branches. Chamber 36 has a length of approximately 38 inches (96.5 cm) and holds approximately 1 gallon (3.8 liters) of liquid when device 50 is located therein. Together, the size of the diameters of the riser conduit 86, Y-fitting 60 and treatment chamber 36 together with the length of tube 94 allows rigid tube 94 to pivot from a position within riser conduit 86 to a position in treatment chamber 54 without breaking tube 94 or the ultraviolet lamp 92 located therein.

To remove device 50, the process is reversed with device 50 being lifted from treatment chamber 36 in a progression exemplified by FIGS. 3C, then 3B and then 3A before device 50 is removed from the upper end of riser conduit 86. This manner of inserting and removing device 50 facilitates the convenient inspection, service and repair of device 50. For example, lamp 92 can be easily replaced by pulling device upwards through conduit 86, removing cap 87 and the burnt out lamp 92 from tube 94, installing a new lamp 92, and returning device 50 to treatment chamber 36 by lowering device 50 through riser conduit 86.

In the illustrated embodiment, device 50 is provided with spacing elements 108 which take the form of hollow cylinders formed of a rigid polymeric material. Spacing elements 108 are secured at circumferentially spaced locations at each end of device 50 by threading a conventional electrical tie 110 through the open center of each of the spacing elements 108, tightening the electrical tie 110 to firmly engage spacing elements 108 with the outer surface of device 50 and then removing the excess length of electrical tie 110. When device 50 is located within treatment chamber, as depicted in FIG. 2, some of the spacing elements 108 are engaged with interior surface 52 to thereby lift tube 94 above the lower most portion of interior surface 52 allowing liquid effluent to flow below tube 94. By providing spacing elements 108 on device 50, tube 94 is completely surrounded by liquid effluent as the effluent flows through treatment chamber 36. While spacing elements 108 do hold device 50 in a position wherein axis 106 of elongate device 50 is positioned generally parallel to chamber axis 68, the central axis 106 is not collinear with chamber axis 68 but is positioned below chamber axis 68. When employing rigid spacing elements that are relatively fixed to device 50, as exemplified by spacing elements 108, the spacing elements must be sufficiently small to allow device 50 to navigate the intersection between riser conduit 86 and treatment chamber 36. In the illustrated embodiment, spacing elements 108 have an outer diameter that is less than about 1 cm.

FIG. 5 illustrates an optional component 112 which is envisioned for use with device 50. This component 112 is a photoelectric device that is sensitive to the ultraviolet light emitted by lamp 92. When the light detected by device 112 falls below a predetermined level, e.g., when bulb 92 is no longer emitting ultraviolet light, device 112 can be used to open or close a switch in an electrical circuit. Device 112 may be coupled with an alarm signaling device such as light 114 on box 104 wherein when the light detected by device 112 falls below the predetermined level, light 114 will be activated indicating the need to service device 50. In the illustrated embodiment, device 112 has been attached directly to tube 94 using an electrical tie 116. Wiring 118 extends from device 112 and together with power cord 108 is routed to box 104 to electrically couple device 112 with light 114.

Tests were conducted using a treatment chamber and chamber volume similar to that of chamber 36 and volume 54. The tests employed a 6031 L ultraviolet lamp commercially available from American Ultraviolet Company having a place of business in Lebanon, Ind. The transformer used with the lamp was a 0250M2315C electronic ballast. The liquid effluent used as an input in the testing procedures was obtained from a municipal water treatment plant and the *Escherichia* Coliform (*E. Coli*) concentration for the liquid effluent was 3437 (CFU/100 ml) (geometric mean). *E. Coli* concentrations were determined using reference to method EPA 600-A-85-076, Membrane Filtration Technique. The liquid effluent used as an input was clear and free of significant solids and did not have appreciable odor or color.

Three samples were run for each of six different flow rates (gallons per minute) through the treatment chamber. The table presented below summarizes the results of these tests.

| Sample Description | Geometric Mean *E. Coli* (CFU/100 ml) | Std. Deviation (CFU/100 ml) | Flow Rate (gallons per minute) | % Reduction of *E. Coli* (Overall Average) |
| --- | --- | --- | --- | --- |
| Raw Influent | 3437 | 1725 | — | — |
| 0.25 gpm Flow Rate | 2 | 2 | 0.28 | 99.9 |
| 0.50 gpm Flow Rate | 7 | 1 | 0.70 | 99.8 |
| 1.00 gpm Flow Rate | 6 | 3 | 1.11 | 99.8 |
| 2.00 gpm Flow Rate | 2 | 2 | 2.22 | 99.9 |
| 4.00 gpm Flow Rate | 20 | 11 | 3.96 | 99.4 |

-continued

| Sample Description | Geometric Mean E. Coli (CFU/100 ml) | Std. Deviation (CFU/100 ml) | Flow Rate (gallons per minute) | % Reduction of E. Coli (Overall Average) |
|---|---|---|---|---|
| 8.00 gpm Flow Rate | 11 | 9 | 7.93 | 99.7 |

As can be seen, the resulting E. Coli concentrations are all well below 235 CFU/100 ml which is typically required for surface discharges.

It is additionally noted that device 50 does not require a water-tight sealed engagement between device 50 and the interior surface 52 for device 50 to function effectively. This ability to insert and remove device 50 without having to form or break a water-tight seal facilitates the convenient insertion and removal of device 50.

While this invention has been described as having an exemplary design, the present invention may be further modified within the spirit and scope of this disclosure. This application is therefore intended to cover any variations, uses, or adaptations of the invention using its general principles.

What is claimed is:

1. A septic tank system comprising:
a tank adapted to receive sewerage, said tank having a tank outlet positioned to discharge liquid effluent from said tank;
a downstream fluid system in fluid communication with said tank outlet and conveying effluent discharged from said tank to at least one discharge location where the effluent is discharged from said septic tank system;
a treatment chamber operably disposed in said downstream fluid system between said tank outlet and said at least one discharge location, said treatment chamber having an interior surface defining a chamber volume wherein effluent discharged from said tank into said downstream fluid system flows through said chamber volume, said chamber volume being an elongate volume defining a chamber axis, said treatment chamber being positioned wherein said chamber axis defines an angle with a horizontal plane of less than approximately 5 degrees; and
an ultraviolet light emitting device removably insertable into said chamber volume and non-sealingly engageable with said interior surface, said ultraviolet light emitting device being an elongate device defining a second axis, and wherein said device comprises first and second pluralities of spacing elements, said first plurality of spacing elements being disposed at circumferentially spaced locations proximate a first end of said device and said second plurality of spacing elements being disposed at circumferentially spaced locations proximate a second end of said device, said spacing elements being engageable with said interior surface to thereby non-attachedly position said device in said chamber volume with a substantial portion of said device being spaced from said interior surface and said second axis being disposed below and substantially parallel with said chamber axis whereby said device may be substantially completely surrounded by the effluent when said chamber volume is only partially filled with effluent.

2. The septic tank system of claim 1 wherein said downstream fluid system includes a first portion immediately preceding said treatment chamber and a second portion immediately following said treatment chamber, said first portion defining a first cross sectional flow area and said second portion defining a second cross sectional flow area, said chamber volume defining a third cross sectional flow area, said first and second cross sectional flow areas each being less than said third cross sectional flow area.

3. The septic tank system of claim 1 wherein the effluent flowing through said treatment chamber flows substantially solely under the influence of gravity.

4. The septic tank system of claim 1 wherein said ultraviolet light emitting device comprises an elongate ultraviolet lamp.

5. The septic tank system of claim 1 wherein only a portion of said first plurality of spacing elements are engageable with said interior surface at one time and wherein only a portion of said second plurality of spacing elements are engageable with said interior surface at one time.

6. A septic tank system comprising:
a tank adapted to receive sewerage, said tank having a tank outlet positioned to discharge liquid effluent from said tank;
a downstream fluid system in fluid communication with said tank outlet and conveying effluent discharged from said tank to at least one discharge location where the effluent is discharged from said septic tank system, said downstream fluid system including a first fluid conduit and a second fluid conduit;
a treatment chamber operably disposed in said downstream fluid system between said tank outlet and said at least one discharge location, said treatment chamber having an interior surface defining a chamber volume, said treatment chamber further defining an inlet and an outlet in fluid communication with said chamber volume, said first fluid conduit being in direct fluid communication with said inlet and said second fluid conduit being in direct fluid communication with said outlet, wherein effluent discharged from said tank into said downstream fluid system enters said chamber volume through said inlet and is discharged from said chamber volume through said outlet;
said first fluid conduit defining a first cross sectional flow area, said second fluid conduit defining a second cross sectional flow area and said chamber volume defining a third cross sectional flow area, each of said first and second cross sectional flow areas being less than said third cross sectional flow area;
an ultraviolet light emitting device removably insertable into said chamber volume; and
wherein said treatment chamber further comprises a Y-fitting, said ultraviolet light emitting device being removably insertable into said chamber volume through said Y-fitting.

7. The septic tank system of claim 6 wherein said chamber volume is an elongate volume defining a chamber axis, said treatment chamber being positioned wherein said chamber axis defines an angle with a horizontal plane of less than approximately 5 degrees.

8. The septic tank system of claim 7 wherein the effluent flowing through said treatment chamber flows substantially solely under the influence of gravity.

9. The septic tank system of claim 6 wherein said first and second fluid conduits comprise substantially cylindrical PVC tubing having a first diameter and said treatment chamber comprises a substantially cylindrical PVC tube having a second diameter, said second diameter being greater than said first diameter.

10. The septic tank system of claim 6 further comprising a plurality of spacing elements disposed on said device, said spacing elements being non-attachedly engageable with said interior surface and thereby spacing said water tight enclosure away from said interior surface.

11. A septic tank system comprising:
a tank adapted to receive sewerage, said tank having a tank outlet positioned to discharge liquid effluent from said tank;
a downstream fluid system in fluid communication with said tank outlet and conveying effluent discharged from said tank to at least one discharge location where the effluent is discharged from said septic tank system;
a treatment chamber operably disposed in said downstream fluid system between said tank outlet and said at least one discharge location, said treatment chamber having an interior surface defining an elongate chamber volume and a chamber axis wherein effluent discharged from said tank into said downstream fluid system flows through said chamber volume, said treatment chamber being positioned below a ground surface and wherein said chamber axis defines an angle with a horizontal plane of less than approximately 5 degrees;
an access port defined by said treatment chamber and in communication with said elongate chamber volume;
an elongate ultraviolet light emitting device defining a second axis and removably insertable into said chamber volume through said access port from a position above the ground surface and wherein said second axis is positioned substantially parallel with said chamber axis when said device is disposed in said chamber volume; and
wherein said treatment chamber further comprises a Y-fitting, said Y-fitting defining said access port.

12. The septic tank system of claim 11 further comprising an inclined riser conduit extending from said Y-fitting to an elevation above the ground surface, said elongate ultraviolet light emitting device being removably insertable into said chamber volume through said inclined riser conduit.

13. The septic tank system of claim 12 wherein said inclined riser conduit defines an angle of approximately 30 degrees with a horizontal plane.

14. The septic tank system of claim 12 wherein said elongate ultraviolet light emitting device comprises an elongate ultraviolet light lamp and a power cord, said ultraviolet light lamp being insertable into said chamber volume through said inclined riser conduit and wherein, when said ultraviolet light lamp is disposed in said chamber volume, said power cord extends through said elongate riser whereby said ultraviolet light lamp is connectable to an electrical power source at a location above the ground surface.

15. The septic tank system of claim 11 wherein said downstream fluid system includes a first portion immediately preceding said treatment chamber and a second portion immediately following said treatment chamber, said first portion defining a first cross sectional flow area and said second portion defining a second cross sectional flow area, said chamber volume defining a third cross sectional flow area, said first and second cross sectional flow areas each being less than said third cross sectional flow area.

16. The septic tank system of claim 15 wherein said first and second downstream fluid system portions comprise substantially cylindrical PVC tubing having a first diameter and said treatment chamber comprises a substantially cylindrical PVC tube having a second diameter, said second diameter being greater than said first diameter and wherein said treatment chamber further comprises a Y-fitting defining said access port and a substantially cylindrical inclined PVC riser extending from said Y-fitting to an elevation above the ground surface, said elongate ultraviolet light emitting device being removably insertable into said chamber volume through said inclined riser.

* * * * *